US010704884B2

(12) United States Patent
Cheng et al.

(10) Patent No.: US 10,704,884 B2
(45) Date of Patent: Jul. 7, 2020

(54) SENSING SYSTEM FOR SENSING A POSITION OF A GEAR SHAFT

(71) Applicant: Tyco Electronics (Shanghai) Co. Ltd., Shanghai (CN)

(72) Inventors: Dawei Cheng, Shanghai (CN); Haizhou Lu, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 12 days.

(21) Appl. No.: 15/982,442

(22) Filed: May 17, 2018

(65) Prior Publication Data
US 2018/0335293 A1    Nov. 22, 2018

(30) Foreign Application Priority Data
May 18, 2017   (CN) .......................... 2017 1 0354006

(51) Int. Cl.
*G01B 7/30* (2006.01)
*G01B 7/04* (2006.01)
(Continued)

(52) U.S. Cl.
CPC .............. *G01B 7/046* (2013.01); *F16H 59/70* (2013.01); *G01B 7/003* (2013.01); *G01B 7/14* (2013.01);
(Continued)

(58) Field of Classification Search
CPC .................................................... G01D 5/145;
G01D 5/14; G01D 5/12; G01D 11/245;
G01B 7/30; G01B 7/003; G01B 7/14;
G01B 11/026
(Continued)

(56) References Cited

U.S. PATENT DOCUMENTS

2006/0283276 A1*   12/2006   Komatsu ............... F16H 59/105
74/335
2010/0294067 A1*   11/2010   Bak ..................... F16H 59/0204
74/473.12
(Continued)

FOREIGN PATENT DOCUMENTS

DE           102013205071     *  9/2014   ............. F16H 63/42

*Primary Examiner* — Raul J Rios Russo
(74) *Attorney, Agent, or Firm* — Barley Snyder

(57) ABSTRACT

The present disclosure discloses a sensing system for sensing a position of a gear shaft. The present disclosure may implement determination of whether the gear shaft is at a reverse gear position, a forward gear position or a neutral gear position by: partitioning a magnet into a first length region magnet and a second length region magnet, wherein the first length region magnet and the second length region magnet have different magnetic field directions, sensing and generating an inductive electrical signal reflecting motions of the first length region magnet and the second length region magnet; storing, by a memory unit, a first type reference signal for the first length region magnet and a second type reference signal for the second length region magnet, which are sensed by simulation; and comparing, by a processing unit, the inductive electric signal against the first type reference signal and the second type reference signal, which reflect different gear positions, respectively. By arranging only one magnet and one set of circuitry mechanical elements to sense a position of the gear shaft, the sensing apparatus according to the present disclosure effectively implements detection of the neutral gear position and the reverse gear position of the gear shaft, which reduces the manufacturing cost and lowers the failure rate.

16 Claims, 8 Drawing Sheets

(51) Int. Cl.
*G01D 5/14* (2006.01)
*F16H 59/70* (2006.01)
*G01D 5/12* (2006.01)
*G01D 11/24* (2006.01)
*G01B 7/00* (2006.01)
*G01B 11/02* (2006.01)
*G01B 7/14* (2006.01)
*F16H 59/68* (2006.01)

(52) U.S. Cl.
CPC ............ *G01B 7/30* (2013.01); *G01B 11/026* (2013.01); *G01D 5/12* (2013.01); *G01D 5/14* (2013.01); *G01D 5/145* (2013.01); *G01D 11/245* (2013.01); *F16H 2059/6823* (2013.01); *F16H 2059/708* (2013.01)

(58) Field of Classification Search
USPC ................. 324/51, 55, 200, 207.11, 207.25
See application file for complete search history.

(56) References Cited

U.S. PATENT DOCUMENTS

| | | | |
|---|---|---|---|
| 2012/0152049 A1* | 6/2012 | Benson | F16H 59/044 74/473.3 |
| 2013/0245992 A1* | 9/2013 | Servel | G01D 5/145 702/150 |
| 2015/0123652 A1* | 5/2015 | Hernandez-Oliver | G01D 5/145 324/207.13 |
| 2015/0369636 A1* | 12/2015 | Deak | G01D 5/2497 324/207.21 |
| 2018/0283901 A1* | 10/2018 | Hernandez-Oliver | H01F 7/02 |

* cited by examiner

SENSING SYSTEM FOR SENSING A POSITION OF A GEAR SHAFT

CROSS-REFERENCE TO RELATED APPLICATIONS

This application claims the benefit of the filing date under 35 U.S.C. § 119(a)-(d) of Chinese Patent Application No. 201710354006.2, filed May 18, 2017.

FIELD OF INVENTION

The present disclosure relates to the field of automobile control, and more particularly relates to a Hall element-based sensing system for sensing a position of a gear shaft.

BACKGROUND OF INVENTION

Currently, position sensors have been widely applied in various industrial fields, e.g., the field of automotive control. Position sensing devices are already known in the art for sensing a position of a gear shaft.

Specifically, for example, to save fuel, after a gear shaft of a vehicle has been at the neutral gear position for a certain time period (e.g., 5 seconds), the ECU (Electronic Control Unit) will generate a Stop control signal to automatically shut down the engine of the vehicle. Then, when the ECU receives a signal indicating that the vehicle clutch pedal is stepped on, if the gear shaft is still at the neutral gear position, the ECU will generate a Start control signal to automatically start the engine of the vehicle (Automatic Start-Stop Technology). Therefore, the control circuit of the vehicle needs a position sensing apparatus to detect the neutral gear position of the gear shaft.

In addition, for the sake of driving safety, when the vehicle gear shaft moves to the reverse gear position, it is needed to turn on a reverse lamp or activate a voice device to alert surrounding pedestrians that the vehicle is in a reverse driving state. Therefore, the control circuit of the vehicle needs a position sensing apparatus to detect the reverse gear position of the gear shaft.

Traditionally, two position sensing apparatuses are needed to implement detecting of the neutral gear position and the reverse gear position of the gear shaft, which require two sets of magnets and two sets of circuitry elements and mechanical elements, incurring a high manufacturing cost. Moreover, with the two sets of circuitry elements and mechanical elements, there would be higher failure rate.

Therefore, it is necessary to provide an improved position sensing apparatus that may reduce the manufacturing cost and lower the failure rate.

SUMMARY OF INVENTION

In view of the drawbacks above, the present disclosure intends to provide an improved sensing system, which may not only effectively sense a position of a gear shaft but also lower the manufacturing cost and the failure rate. A specific technical solution is provided below:

A sensing system for sensing a position of a gear shaft, the gear shaft being provided, in its axial direction, with a plurality of groups of gear positions, the plurality of groups of gear positions including a plurality of neutral gear positions arranged along the axial direction of the gear shaft and a plurality of pairs of motion gear positions oppositely arranged at two sides of the neutral gear positions, one of the motion gear positions being a reverse gear position, while the remaining being forward gear positions, the sensing system comprising:

a sensing magnet that is fixedly arranged on the gear shaft and moves with the gear shaft, wherein the sensing magnet is axially partitioned into a first length region magnet and a second length region magnet; a magnetic field direction of the first length region magnet at a side in contact with the gear shaft is a first polarity, while the magnetic field direction thereof at a side distant from the gear shaft is a second polarity; a magnetic field direction of the second length region magnet at a side in contact with the gear shaft is a second polarity, while the magnetic field direction thereof at a side distant from the gear shaft is a first polarity such that the magnetic field direction of the first length region magnet is opposite to the magnetic field direction of the second length region magnet; and a sensing unit arranged to be capable of sensing a magnetic field change when the sensing magnet moves, wherein when the gear shaft has a position change upon operation, the sensing unit senses the magnetic field change of the sensing magnet and generates a corresponding inductive electrical signal, the inductive electrical signal being compared against a pre-determined reference inductive electrical signal to indicate whether the gear shaft is at a forward gear position or a reverse gear position.

In an embodiment of the present disclosure, the first length region magnet generates a first form of magnetic field change; the second length region magnet generates a second form of magnetic field change.

In an embodiment of the present disclosure, when the gear shaft moves to the remaining one or more groups of the forward gear positions, the sensing unit senses the first form of magnetic field change to indicate a corresponding forward gear position; when the gear shaft moves to the reverse gear position or a corresponding forward gear position, the sensing unit senses the second form of magnetic field change, to indicate whether the gear shaft is located at the reverse gear position or the corresponding forward gear position.

In an embodiment of the present disclosure, the sensing system further comprises: a memory unit configured for pre-storing a first type reference signal for the first length region magnet and a second type reference signal for the second length region magnet; a processing unit connected to the sensing unit and the memory unit, configured for transducing the magnetic change sensed by the sensing unit into an inductive electrical signal and comparing the inductive electrical signal against the first type reference signal and the second type reference signal, to thereby determine whether the gear shaft is at a forward gear position or a reverse gear position.

In an embodiment of the present disclosure, the first type reference signal is an inductive electrical signal generated by the sensing unit by simulating, in advance, sensing of motion of the first length region magnet; the second type reference signal is an inductive electrical signal generated by the sensing unit by simulating, in advance, sensing of motion of the second length region magnet.

In an embodiment of the present disclosure, the first type reference signal has a plurality of first signal reference values that represent positions of a plurality of forward gear s; the second type reference signal has a plurality of second signal reference values that represent positions of forward gears and the reverse gear; and the processing unit transduces the magnetic field change sensed by the sensing unit into an inductive electrical signal and compares the inductive electrical signal against the plurality of first signal reference values and the plurality of second signal reference values to thereby distinguish between the forward gear positions and the reverse gear position.

In an embodiment of the present disclosure, when the inductive electrical signal is identical to one reference value in the plurality of first signal reference values and the plurality of second signal reference values or a difference between the inductive electrical signal and the reference value is within a specific range, the processing unit determines that the gear shaft is at a gear position corresponding to the reference value.

In an embodiment of the present disclosure, the sensing system further comprises: an indicating circuit connected to the processing unit; wherein when the processing unit determines that the gear shaft is at a forward gear position, the processing unit sets the indicating circuit to a first state; when the processing unit determines that the gear shaft is at the reverse gear position, the processing unit sets the indicating circuit to a second state.

In an embodiment of the present disclosure, the indicating circuit transmits a state electrical signal to a vehicle control system, for the vehicle control system to make an engine start or stop determination.

In an embodiment of the present disclosure, the neutral gear position is arranged within a first rotating angle along two sides of an axis of the gear shaft; the sensing unit senses a magnetic field strength change within a neutral gear position range where the first length region magnet and the second length region magnet are located within the first rotating angle and generates a sensed electrical signal; the first type reference signal further has a first neutral gear position reference value representing motion of the first length region magnet; the second type reference signal also has a second neutral gear position reference value representing motion of the second length region magnet; and the processing unit transduces a magnetic field change sensed by the sensing unit into the inductive electrical signal, and compares the inductive electrical signal against the first neutral gear position reference value and the second neutral gear position reference value; wherein when the inductive electrical signal is identical or substantially identical to the first neutral gear position reference value or the second neutral gear position reference value, the processing unit determines that the gear shaft is at the neutral gear position corresponding to the reference value.

In an embodiment of the present disclosure, the second length region magnet corresponds to the reverse gear position and a corresponding forward gear position; the first length region magnet corresponds to the remaining forward gear positions.

In an embodiment of the present disclosure, a length of the second length region magnet is about ½ of that of the first length region magnet.

In an embodiment of the present disclosure, the sensing unit is a separate Hall sensing unit.

In an embodiment of the present disclosure, the sensing unit is a Hall sensing unit.

In an embodiment of the present disclosure, the plurality of groups of gear positions are classified into three pairs of gear positions, which are:

first pair of gear positions: $1^{st}$ gear position and $2^{nd}$ gear position;

second pair of gear positions: $3^{rd}$ gear position and $4^{th}$ gear position;

third pair of gear positions: $5^{th}$ gear position and R gear position;

wherein the $1^{st}$ gear position, $2^{nd}$ gear position, $3^{rd}$ gear position, $4^{th}$ gear position, and $5^{th}$ gear position are forward gear positions, and the R gear position is the reverse gear position.

In an embodiment of the present disclosure, the first length region magnet and the second length region magnet are sequentially arranged along the axial direction of the gear shaft.

In an embodiment of the present disclosure, the sensing magnet is an integrally formed part.

In an embodiment of the present disclosure, the sensing unit is arranged relative to the sensing magnet such that: when the gear shaft is at a selected neutral gear position, the sensing unit aligns with the sensing magnet along a radial direction of the gear shaft.

In an embodiment of the present disclosure, the first type reference signal and the second type reference signal do not overlap.

In an embodiment of the present disclosure, a maximum value of the first type reference signal is smaller than a minimum value of the second type reference signal.

In an embodiment of the present disclosure, the first type reference signal and the second type reference signal are voltage signals, duty signals, or Single Edge Nibble Transmission signals.

In an embodiment of the present disclosure, the inductive electrical signal is a voltage signal, a duty signal, or a Single Edge Nibble Transmission signal.

The prior art uses a neutral gear position sensor to sense and output a neutral gear position. However, it is difficult for such sensors to distinguish between forward gear positions and reverse gear position and thus need an extra sensor to distinguish the reverse gear position.

The present disclosure may implement determination of whether the gear shaft is at a reverse gear position, a forward gear position or a neutral gear position by: partitioning a magnet into a first length region magnet and a second length region magnet, wherein the first length region magnet and the second length region magnet have different magnetic field directions, correspond to different gear positions, and may produce a first form of magnetic field change and a second form of magnetic field change, respectively, such that the sensor senses the first form of magnetic change and the second form of magnetic change to generate an inductive electrical signal; storing, by a memory unit, a first type reference signal for the first length region magnet and a second type reference signal for the second length region magnet; and comparing, by a processing unit, the inductive electric signal against the first type reference signal and the second type reference signal, respectively. By arranging only one magnet and one set of circuitry/mechanical elements to sense a position of the gear shaft, the sensing apparatus according to the present disclosure effectively implements detection of the neutral gear position and the reverse gear position of the gear shaft, which reduces the manufacturing cost and lowers the failure rate. Further, the present disclosure is compatible with the original mechanical engineering design without changing the structural components, sizes and shapes of the existing designs, and achieves the technical effect by only changing the magnet structure.

BRIEF DESCRIPTION OF THE DRAWINGS

Hereinafter, the present disclosure will be described in further detail with reference to the accompanying drawings.

DETAILED DESCRIPTION OF EMBODIMENTS

Figure 1:
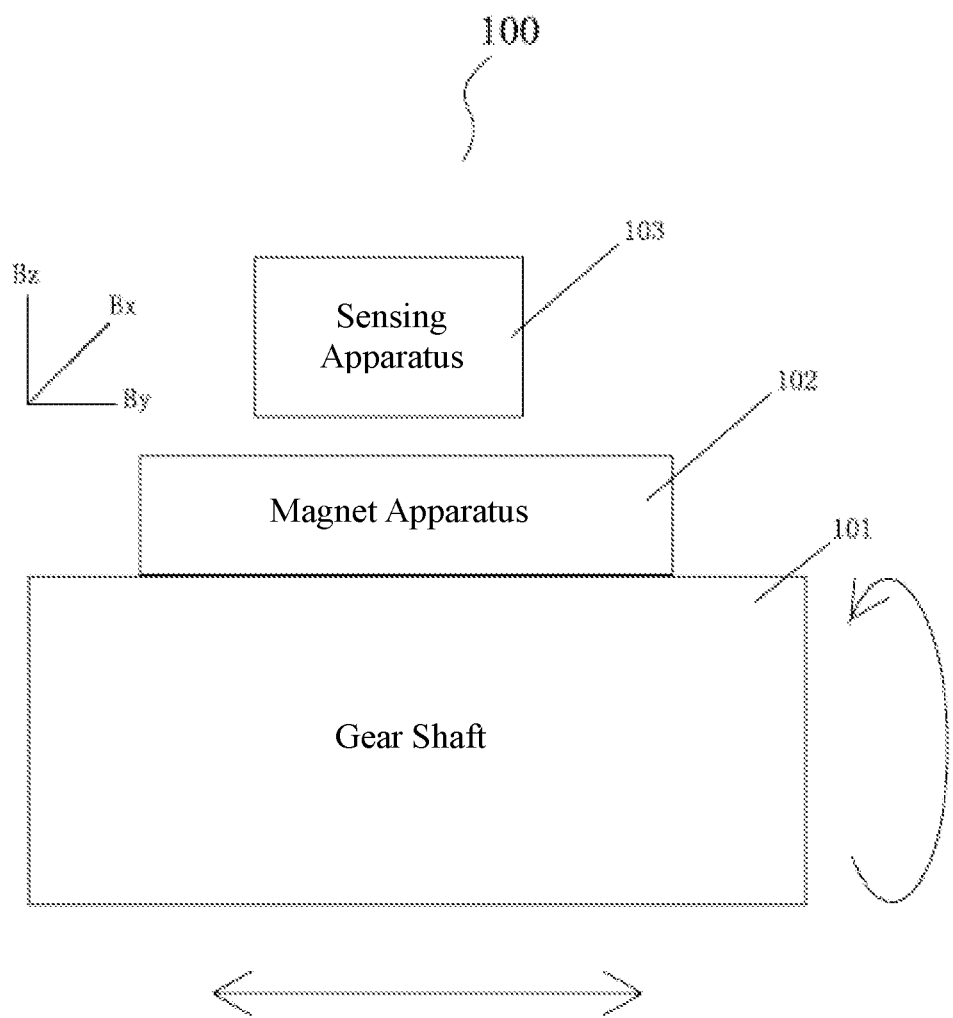
FIG. 1 is a structural schematic diagram of a sensing system of the present disclosure.

Hereinafter, various embodiments of the present disclosure will be described with reference to the accompanying drawings that constitute part of the specification. It should be understood that although terms indicating directions, such as "front," "rear," "up," "down," "left," "right," are used in the present disclosure to describe various exemplary structural parts and elements of the present disclosure, these terms are only determined based on the exemplary orientations shown in the figures for the convenience of illustration. Because the embodiments disclosed by the present disclosure may be set according to different directions, these terms indicating direction are only used for illustration, not for limiting. In possible circumstances, same or like reference numerals used in the present disclosure refer to the same parts.

FIG. 1 is a structural schematic diagram of a sensing system of the present disclosure.

As illustrated in FIG. 1, a sensing system 100 comprises a magnet apparatus 102 and a sensing apparatus 103. The magnet apparatus 102 is mounted on a gear shaft 101; the sensing apparatus 102 is fixedly arranged above the magnet apparatus 102 and is spaced from the magnet apparatus 102 with a certain distance or interval. The gear shaft 101 may make a rectilinear motion and a rotary motion along its own axis; the magnet apparatus 102 makes a rectilinear motion and a rotary motion with the gear shaft 101. When the gear shaft 101 is making a rectilinear motion, the gear shaft is at a neutral gear position; when the gear shaft 101 is making a rotary motion, the gear shaft moves to a corresponding forward gear position or the reverse gear position. When the magnet apparatus 102 moves with the gear shaft 101, the magnet apparatus 102 may produce a magnet induction strength change with respect to the position (or detection position) of the sensing apparatus 103 and then may produce a magnetic field change. When the sensing apparatus 103 is impacted by the magnetic induction strength change of the magnet apparatus 102, the sensing apparatus 103 may generate an inductive electrical signal. As an exemplary embodiment, the sensing apparatus 103 may comprise a Hall element or a magneto-resistive sensor, for generating an inductive electrical signal in response to a magnetic field change induced by the magnetic induction strength change. More specifically, the sensing apparatus 103 may comprise a current-carrying semi-conductor membrane, so as to be capable of generating an inductive electrical signal perpendicular to a current direction when being subjected to a magnetic induction strength change/magnetic field change perpendicular to the membrane surface. Within a gap between the magnet apparatus 102 and the sensing apparatus 103, the magnetic induction strength/magnetic field changes along a three-dimensional coordinate (Bx, By, Bz). The sensing apparatus 103 is usually designed to detect a two-dimensional or three-dimensional magnetic field change along Bx or By.

Figure 2:
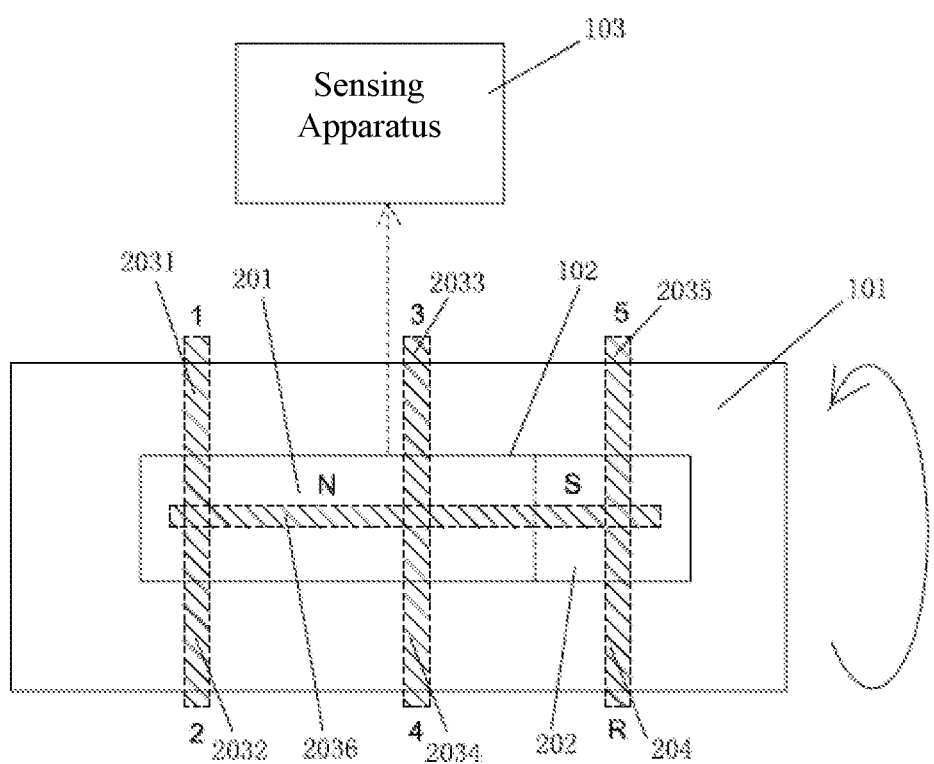
FIG. 2 is a top view of the sensing system of the present disclosure.

FIG. 2 is a top view of the sensing system with a magnet apparatus of the present disclosure.

The sensing apparatus 103 should be shown as to be located above the magnet apparatus 102; however, to better illustrate the principle of the present disclosure, the sensing apparatus 103 is schematically shown as to be located at one side of the gear shaft 101 in FIG. 2; a dotted line is used instead to reflect the actual positional relationship between the magnet apparatus 102 and the sensing apparatus 103.

As shown in FIG. 2, the magnet apparatus 102 has a length L along a longitudinal direction (or length direction) of the gear shaft 101 to ensure that the sensing apparatus 103 is always within an effective detection region of the magnet apparatus 102 when the gear shaft 101 moves rectilinearly along the longitudinal direction of the gear shaft 101. The magnet apparatus 102 has a width W along a transverse direction (or width direction) of the gear shaft 101 to ensure that the sensing apparatus 103 is always within an effective detection region of the magnet apparatus 102 when the gear shaft 101 rotates about the axis of the gear shaft 101.

FIG. 2 shows relative positions between 6 gear positions of a manual gearbox vehicle and the magnet apparatus 102. The gear shaft 101 defines a plurality of groups of gear positions within a stroke of rectilinear motion; and meanwhile when the gear shaft 101 is rotating, respective positions in the plurality of gear positions correspond to a plurality of pairs of motion gear positions oppositely arranged at two sides of the axis of the gear shaft 101 at two angle limit positions of a first rotating angle (neutral gear position angle), which are respectively: $1^{st}$ gear position 2031 and $2^{nd}$ gear position 2032, $3^{rd}$ gear position 2033 and $4^{th}$ gear position 2034, $5^{th}$ gear position 2035 and reverse gear position 204, forming three pairs of motion gear positions; one of a pair of gear positions ($5^{th}$ gear position 2035 and the reverse gear position 204) at one end of the gear shaft 101 is the reverse gear position 204, and the remaining gear positions are all forward gear positions, wherein the reverse gear position 204 (R gear position) is arranged at a lower side of the gear shaft 101. With the rectilinear motion of the gear shaft 101, the magnet apparatus 102 may move with the gear shaft 101 at the neutral gear position 2036. With rotation of the gear shaft 101, the magnet apparatus 102 may make a left-right rectilinear motion with the gear shaft 101 along the axial direction of the gear shaft 101, wherein three working positions are provided in the axial direction of the gear shaft 101, i.e., $1^{st} \sim 2^{nd}$ gear position, $3^{rd} \sim 4^{th}$ gear position, and $5^{th} \sim R$ gear position. When the magnet apparatus 102 is at the $1^{st} \sim 2^{nd}$ gear positions, upward rotation of the gear shaft 101 about the axis thereof makes it engage to the 1st gear position 2031, while downward rotation of the gear shaft 101 makes it engage to the $2^{nd}$ gear position 2032; when the magnet apparatus 102 is at the $3^{rd} \sim 4^{th}$ gear positions, upward rotation of the gear shaft 101 makes it engage to the $3^{rd}$ gear position 2033, while downward rotation of the gear shaft 101 makes it engage to the $4^{th}$ gear position 2034; when the magnet apparatus 102 is at the $5^{th}$~R gear positions, upward rotation of the gear shaft 101 makes it engage to the $5^{th}$ gear position 2035, while downward rotation of the gear shaft 101 makes it engage to the R gear position 204.

Because the rotating angles to the $1^{st}$ gear position 2031, $3^{rd}$ gear position 2033, and $5^{th}$ gear position 2035 are identical and the rotating angles to the $2^{nd}$ gear position 2032, $4^{th}$ gear position 2034, and R gear position 204 are identical during the rotating motion of the gear shaft 101, an inventive focus of the present disclosure is how to distinguish regarding whether the gear shaft is at the R gear position 204 or at forward gear positions (e.g., $2^{nd}$ gear position 2032, $4^{th}$ gear position 2034) whose positions overlap with the R gear position 204.

The magnet apparatus 102 includes, along a rectilinear motion direction (i.e., length direction), a first length region magnet 201 and a second length region magnet 202, wherein length of the second length region magnet 202 is ½ (or other proportion) of that of the first length region magnet 201. Arrangement of the magnet apparatus 102 on the gear shaft 101 should guarantee the following positional relationships: when the magnet apparatus 102 is located at the $1^{st}$~$2^{nd}$ gear positions or $3^{rd}$~$4^{th}$ gear positions, the detection position of the sensing unit 401 of the sensing apparatus 103 is the first length region magnet 201; when the magnet apparatus 102 is located at the $5^{th}$~R gear positions, the detection position of the sensing unit 401 of the sensing apparatus 103 is the second length region magnet 202.

Figure 3:
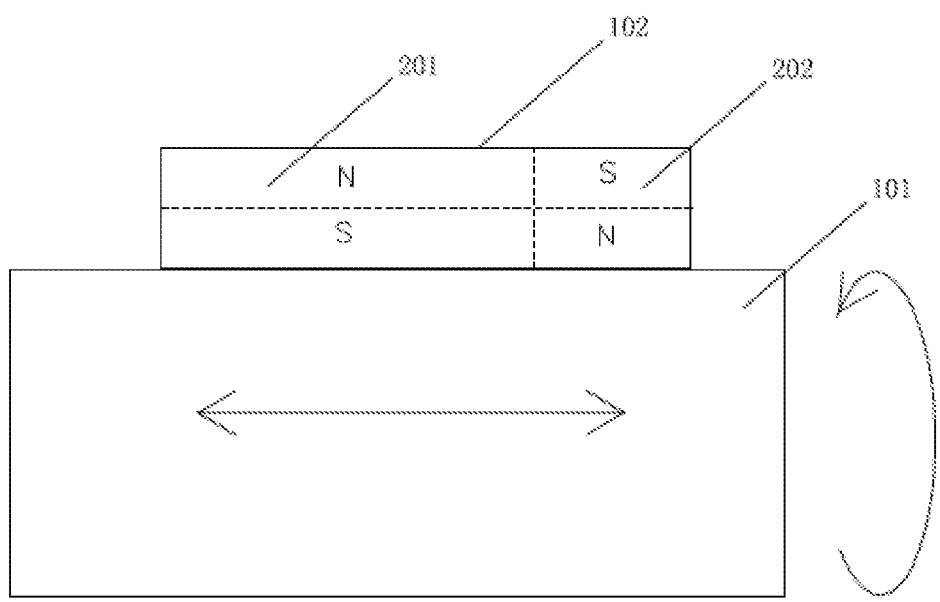
FIG. 3 is a side view of a gear shaft and a magnet apparatus of the present disclosure.

FIG. 3 is a side view of a gear shaft and a magnet apparatus of the present disclosure. As shown in FIGS. 2 and 3, a magnetic field direction of the first length region magnet 201 is opposite to that of the second length region magnet 202. For example, as exemplarily shown in FIG. 2, the magnetic field direction of the first length region magnet 201 is arranged such that south pole (S) of the first length region magnet 201 contacts a surface of the gear shaft 101, while its opposite side (distant side) is the north pole (N) facing the sensing apparatus 103; the second length region magnet 202 is arranged such that its north pole (N) is attached on the surface of the gear shaft 101, while its opposite side is the south pole (S) facing the sensing apparatus 103.

Because the magnet apparatus 102 includes the first length region magnet 201 and the second length region magnet 202 and the magnetic field direction of the first length region magnet 201 being opposite to that of the second length region magnet 202 and that of a reference magnet 001, when the sensing apparatus 103 works during a process in which the magnet apparatus 102 moves with the gear shaft 101, an inductive electrical signal outputted by the sensing apparatus 103 by sensing a magnetic induction strength change of the first length region magnet 201 is different from an inductive electrical signal outputted by the sensing apparatus 103 by sensing a magnetic induction strength change of the second length region magnet 202. In other words, because the detection position of the sensing unit 401 of the sensing apparatus 103 is the second length region magnet 202 when the magnet apparatus 102 is at the $5^{th}$ gear position 2035 or the R gear position 204, while the detection position is the first length region magnet 201 when the magnet apparatus 102 is at another gear positions, the magnetic induction strength change of the second length region magnet 202 sensed by the sensing apparatus 103 when the magnet apparatus 102 is at the R gear position 204 is different from the magnetic induction strength change of the first length region magnet 201 sensed by the sensing apparatus 103 when the magnet apparatus 102 is at a forward gear position (i.e., $2^{nd}$ gear position 2032 and $4^{th}$ gear position 2034) overlapping with the R gear position 204. Through such a sensing method, the R gear position is distinguished from the forward gears positions overlapping with the R gear position (i.e., $2^{nd}$ gear position 2032 and $4^{th}$ gear position 2034), which is specifically shown in FIG. 6.

Figure 4:
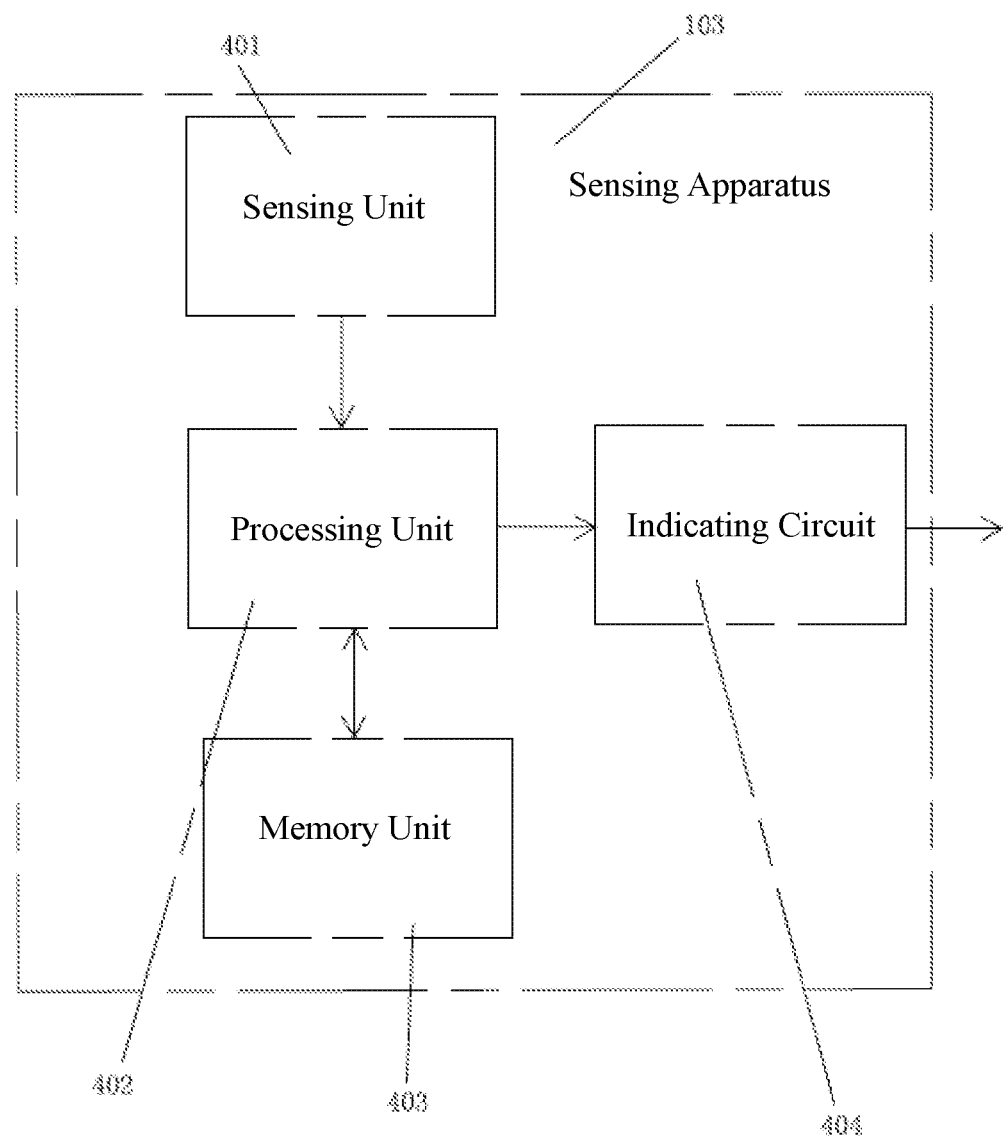
FIG. 4 is a structural schematic diagram of functional modules of a sensing apparatus of the present disclosure.

The sensing apparatus 103 senses in advance the inductive electrical signals of the magnet apparatus 102 at different positions when the magnet apparatus 102 moves with the gear shaft 101, and uses the inductive electrical signals of the magnet apparatus 102 at different positions as simulated reference signals to be stored in a memory unit 403, details of which are shown in FIG. 4.

FIG. 4 is a structural schematic diagram of functional modules of the sensing system of the present disclosure.

As shown in FIG. 4, the sensing apparatus 103 comprises a sensing unit 401, a processing unit 402, a memory unit 403, and an indicating circuit 404. The sensing unit 401 is configured for sensing a magnetic induction strength change of the magnet apparatus 102. The memory unit 403 is configured for storing actually measured magnetic induction strength change signals, a first type reference signal 601 generated by sensing a first length region magnet 201 at different positions, and a second type reference signal 602 generated by sensing a second length region magnet 202 at different positions. The processing unit 402 transduces the magnetic induction strength change measured by the sensing unit 401 into an inductive electrical signal, compares the inductive electrical signal against the reference signals to thereby determine a position of the gear shaft 101, and when the gear shaft 101 is at a neutral or reverse gear position, the processing unit 402 controls the indicating circuit 404 to emit a neutral gear position signal or reverse gear position signal. The indicating circuit 404 emits, under control by the processing unit 402, the neutral gear position signal or reverse gear position signal to the external of the sensing apparatus 103.

Figure 6:
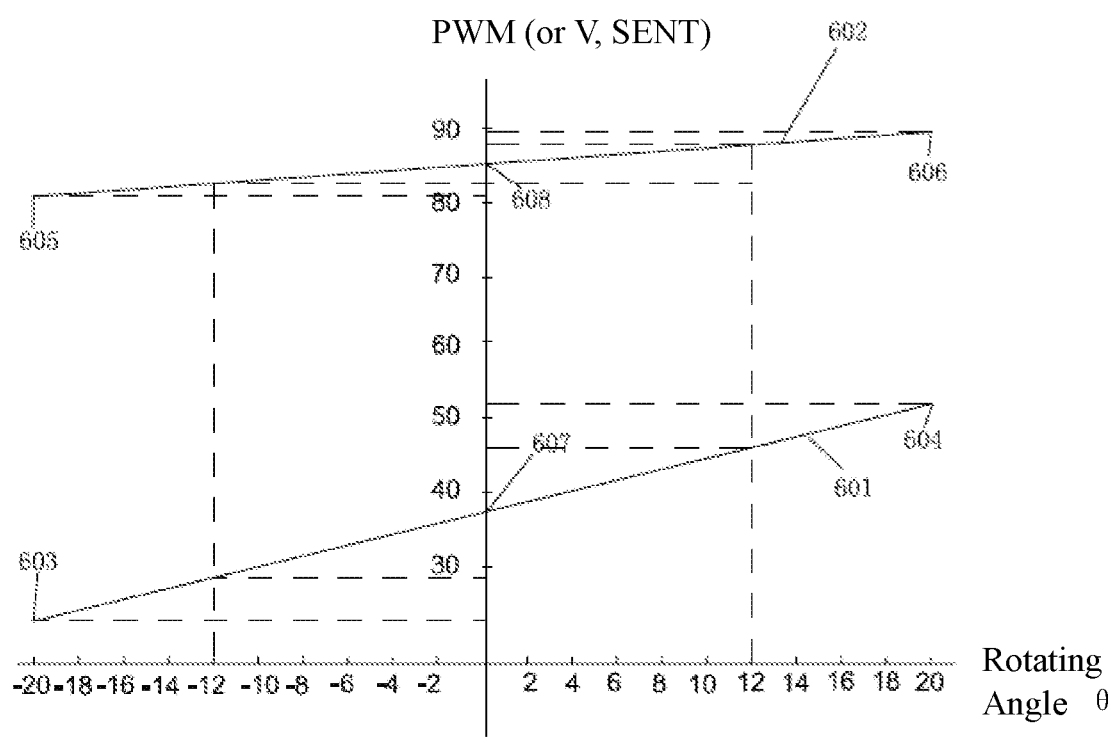
FIG. 6 is a schematic diagram where the sensing apparatus transduces a magnetic field signal into an inductive electrical signal at different rotating angles corresponding to different gear positions.

Prior to actual sensing, it is needed to store simulated reference signals which is compared with the actually sensed inductive electrical signal obtained in actual sensing to further determine the position of the gear shaft 101. The simulated reference signals are obtained and stored in advance through experiments on the magnet apparatus 102, details of which are shown in FIG. 6.

Figure 5A:
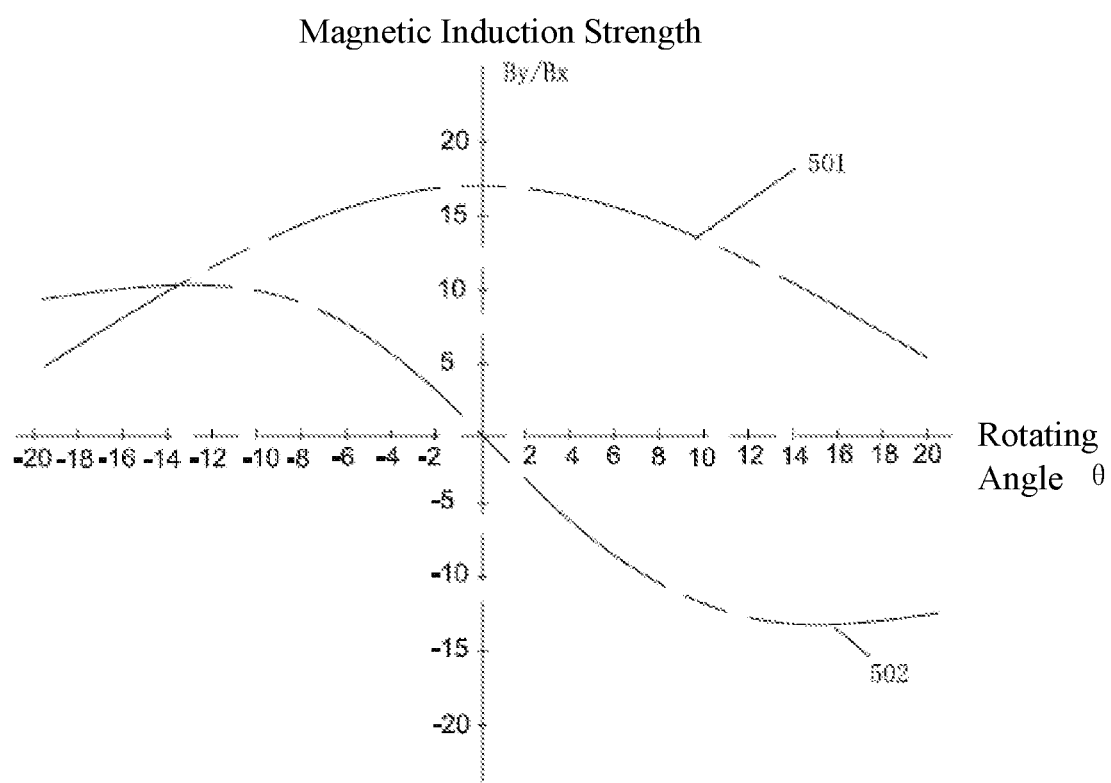
FIG. 5a is a schematic diagram of magnetic induction strength changes of the magnet apparatus sensed by the sensing apparatus at different rotating angles corresponding to the $1^{st} \sim 2^{nd}$ gear positions.

FIG. 5a is a schematic diagram of magnetic induction strength changes of the magnet apparatus sensed by the sensing apparatus at different rotating angles corresponding to the $1^{st}$~$2^{nd}$ gear positions.

As shown in FIG. 5a, when the magnet apparatus 102 continuously rotates with the gear shaft 101 between the $1^{st}$ gear position 2031 and the $2^{nd}$ gear position 2032, if an output of the sensing apparatus 103 is transmitted to an oscillograph, a first curve 501 and a second curve 502 may be observed from the oscillograph; at this point, the sensing apparatus 103 senses the magnetic induction strength change of the first length region magnet 201. In the coordinate system shown in FIG. 5a, X coordinate represents change of the rotating angle θ of the gear shaft 101, while Y coordinate represents changes Bx and By of the magnetic induction strength.

The first curve 501 represents a magnetic induction strength change curve of the magnet apparatus 102 along the Bx dimension sensed by the sensing unit 401 in the sensing apparatus 103 when the magnet apparatus 102 moves between the $1^{st}$ gear position 2031 and the $2^{nd}$ gear position 2032 with the gear shaft 101, wherein the first curve 501 is a cosinoidal function curve. The second curve 502 represents a magnetic induction strength change curve of the magnet apparatus 102 along the By dimension sensed by the sensing apparatus 103 when the magnet apparatus 102 moves between the 1$^{st}$ gear position 2031 and the 2$^{nd}$ gear position 2032 with the gear shaft 101, wherein the first curve 502 is a sinusoidal function curve.

The processing unit 402 transduces the first curve 501 and the second curve 502 measured by the sensing unit 401 into an inductive electrical signal in conformity with the first type reference signal 601 of a linear function as shown in FIG. 6 and stores it in the memory unit 403. The same applies to the second type reference signal 602.

The processing unit 402 performs computation through the following steps:

(1) measuring a two-dimensional relationship between By, Bx versus the mechanical strokes. Measuring, in advance, a plurality of groups of magnetic induction intensities By and Bx corresponding to the actual mechanical motion positions of the gear shaft 101.

(2) establishing a two-dimensional relationship between the magnetic field angle θ and the mechanical stroke of the gear shaft 101:

$$θ=a \tan 2(By/Bx)*180/π;$$

(3) establishing and outputting a function relationship between the inductive electrical signal (V) and the magnetic field angle θ:

$$Y1=(b2-b1)/(a2-a1)*θ+(a2b1-a1b2)/(a2-a1);$$

$$Y2=(b4-b3)/(a4-a3)*θ+(a4b3-a3b4)/(a4-a3);$$

where Y1 represents a calibrated curve of the first type reference signal 601 corresponding to the forward gear positions 1, 2, 3, 4; Y1 may be derived through the equation above by taking two calibration points [603 (a1, b1) coordinate and 604 (a2, b2) coordinate] from among the pre-sensed calibration points; Y2 represents a calibrated curve of the second type reference signal 602 corresponding to the forward gear position 5 and the rear gear position R; Y2 may be derived according to the equation above by taking two calibration points [605 (a3, b3) coordinate and 606 (a4, b4) coordinate] from among the pre-sensed calibration points.

Because two-dimensional linear relationship between the mechanical stroke and the output electrical signal V may be obtained for the forward gear positions and the reverse gear position, respectively, to establish a plurality of groups of two-dimensional relationship arrays, whether the gear shaft is currently at a forward gear position or at the reverse gear position may be determined by determining in which group of the two-dimensional relationships the measured electrical signal V' falls, which will be detailed infra.

Figure 5B:
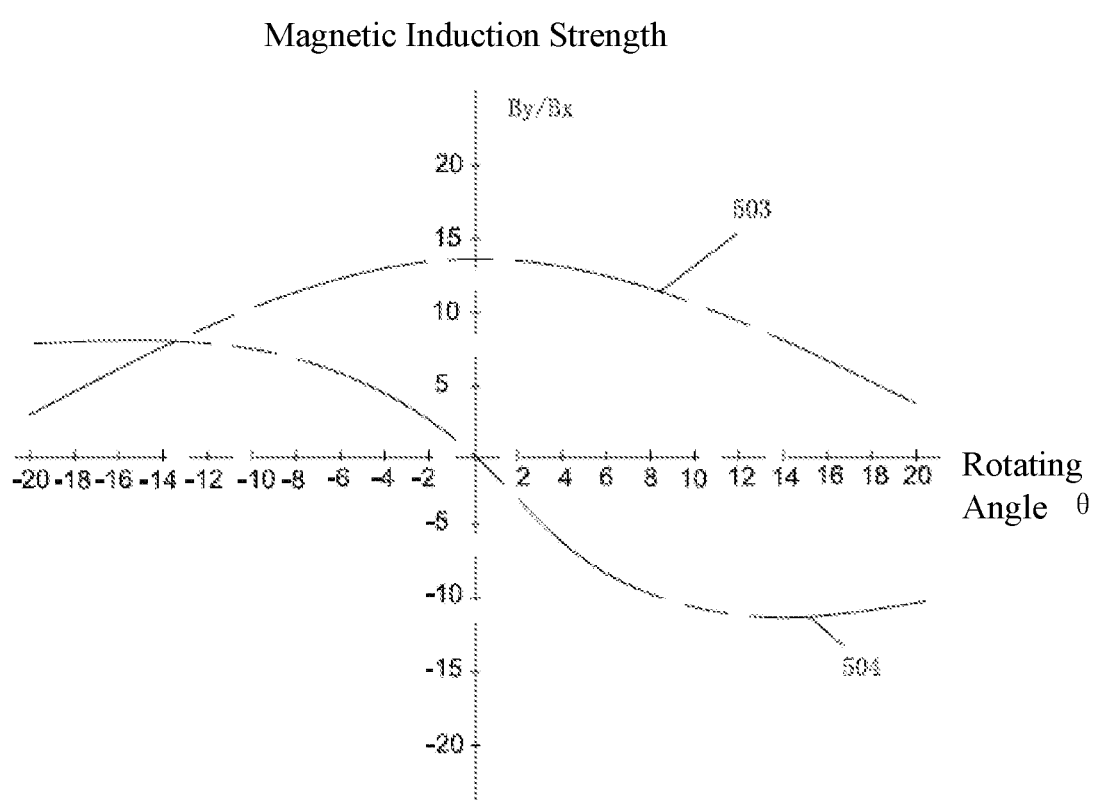
FIG. 5b is a schematic diagram of magnetic induction strength changes of the magnet apparatus sensed by the sensing apparatus at different rotating angles corresponding to the $3^{rd} \sim 4^{th}$ gear positions.

FIG. 5b is a schematic diagram of magnetic induction strength changes of the magnet apparatus sensed by the sensing apparatus at different rotating angles corresponding to the 3$^{rd}$ and 4$^{th}$ gear positions. By adopting a same sensing method as that of 1$^{st}$~2$^{nd}$ gear positions, the sensing apparatus 103 senses a magnetic induction strength change when the magnet apparatus 102 rotates continuously with the gear shaft 101 between the 3$^{rd}$ gear position 2033 and the 4$^{th}$ gear position 2034, thereby obtaining a third curve 503 and a fourth curve 504.

X coordinate represents change of the rotating angle θ of the gear shaft 101, while Y coordinate represents changes Bx and By of the magnetic induction strength.

As shown in FIG. 5b, the third curve 503 represents a magnetic induction strength change curve of the magnet apparatus 102 along the Bx dimension sensed by the sensing unit 401 when the magnet apparatus 102 moves between the 3$^{rd}$ gear position 2033 and the 4$^{th}$ gear position 2034 with the gear shaft 101; and the fourth curve 504 represents a magnetic induction strength change curve of the magnet apparatus 102 along the By dimension sensed by the sensing unit 401 when the magnet apparatus 102 moves with the gear shaft 101 between the 3$^{rd}$ gear position 2033 and the 4$^{th}$ gear position 2034. Because the sensing unit 401 of the sensing apparatus 103 also senses the magnetic induction strength change of the first length region magnet 201 when the gear shaft 101 moves between the 3$^{rd}$ gear and the 4$^{th}$ gear position and between the 1$^{st}$ gear and the 2$^{nd}$ gear position, the third curve 503 is substantially identical to the first curve 501, and the fourth curve 504 is substantially identical to the second curve 502. Further, according to the same computation method as that of the 1$^{st}$~2$^{nd}$ gear positions, computing the third curve 503 and the fourth curve 504 may also result in the first type reference signal 601 shown in FIG. 6.

Figure 5C:
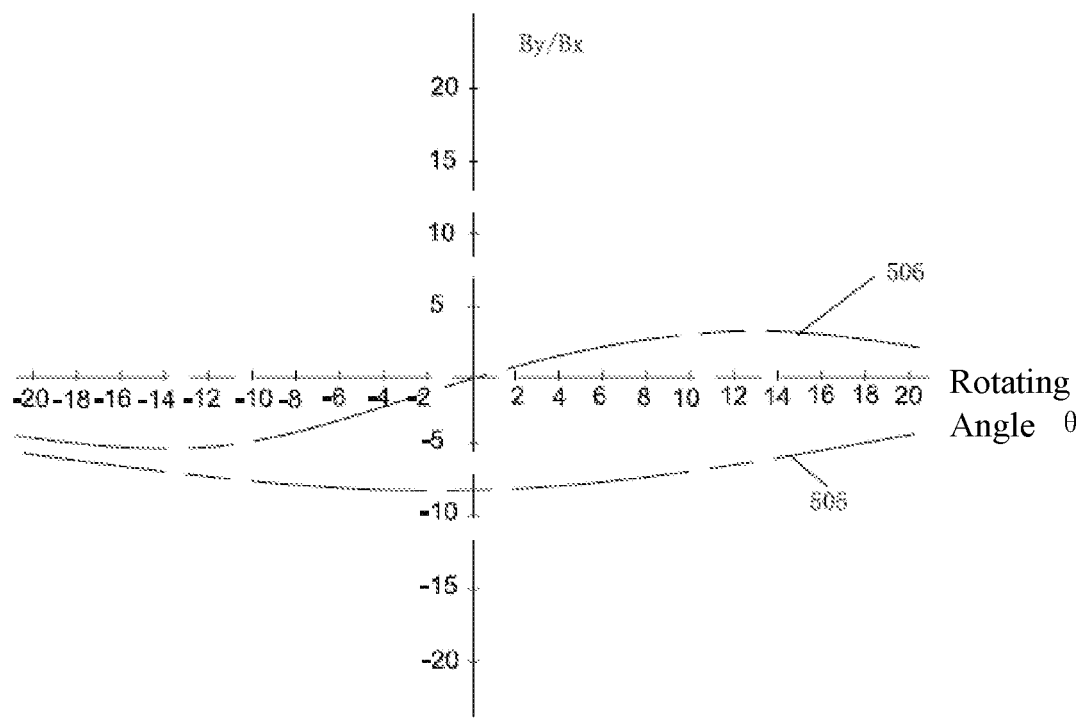
FIG. 5c is a schematic diagram of magnetic induction strength changes of the magnet apparatus sensed by the sensing apparatus at different rotating angles corresponding to the $5^{th} \sim R$ gear positions.

FIG. 5c is a schematic diagram of magnetic induction strength changes of the magnet apparatus sensed by the sensing apparatus at different rotating angles corresponding to the 5$^{th}$~R gear positions. X coordinate represents change of the rotating angle θ of the gear shaft 101, while Y coordinate represents changes Bx and By of the magnetic induction strength.

As shown in FIG. 5c, the fifth curve 505 represents a magnetic induction strength change curve of the magnet apparatus 102 along the Bx dimension sensed by the sensing unit 401 when the magnet apparatus 102 moves with the gear shaft 101 between the 5$^{th}$ gear position 2035 and the R gear position 204; and the sixth curve 506 represents a magnetic induction strength change curve of the magnet apparatus 102 along the By dimension sensed by the sensing unit 401 when the magnet apparatus 102 moves with the gear shaft 101 between the 5$^{th}$ gear position 2035 and the R gear position 204. When the gear shaft 101 moves between 5$^{th}$ gear position and the R gear position, the sensing unit 401 of the sensing apparatus 103 senses the magnetic induction strength change of the second length region magnet 202; because the magnetic field direction of the second length region magnet 202 is opposite to that of the first length region magnet 201, the sensing apparatus 103 obtains a fifth curve 505 different from the first curve 501 and a sixth curve 506 different from the second curve 502. Further, according to the same computation method as that of the 1$^{st}$~2$^{nd}$ gear positions, computing the fifth curve 505 and the sixth curve 506 may also result in the second type reference signal 602 shown in FIG. 6.

FIG. 6 is a schematic diagram where the sensing apparatus transduces a magnetic field signal into an inductive electrical signal at different rotating angles corresponding different gear positions.

In FIG. 6, the transverse coordinate represents a rotating angle; the longitudinal coordinate represents an inductive electrical signal outputted by the sensing apparatus 103. The present disclosure will be illustrated with a PWM (Pulse Width Modulation) signal as an example. In fact, other signal forms known in the art may also be used, e.g., a voltage signal (V) or a Single Edge Nibble Transmission (SENT) signal. In FIG. 6, the first type reference signal 601 represents a simulated reference signal of the first length region magnet 201 of the magnet apparatus 102 sensed by the sensing apparatus 103, and the second type reference signal 602 represents a simulated reference signal of the second length region magnet 202 of the magnet apparatus 102 sensed by the sensing apparatus 103. The first type reference signal 601 and the second type reference signal 602 are both represented as linear function curves. Specific computation manners of the first type reference signal 601 and the second type reference signal 602 have been described in detail in FIG. 5a above.

Specifically, when the magnet apparatus 102 continuously rotates with the gear shaft 101, the sensing apparatus 103 will respond to the magnetic induction strength change and/or magnetic field change produced by the magnet apparatus 102 along the Bx and By dimensions.

Based on the first type reference signal 601 and the second type reference signal 602 in FIG. 6, because the first type reference signal 601 and the second type reference signal 602 are distributed as a first output line and a second output line of a linear function, respectively, different numerical values represent different gear positions, and thus the first type reference signal 601 and the second type reference signal 602 may have a plurality of signal reference values (or ranges), which are respectively: simulated $1^{st}$ gear position~$3^{rd}$ gear position reference signal 603 corresponding to the $1^{st}$ gear position 2031 and the $3^{rd}$ gear position 2033; simulated $2^{nd}$ gear position~$3^{rd}$ gear position reference signal 604 corresponding to the $2^{nd}$ gear position 2032 and the $4^{th}$ gear position 2034; simulated R gear position reference signal 606 corresponding to the R gear position 204. Besides, one simulated neutral gear position reference signal 607, 608 is obtained in a middle angle region of the first type reference signal 601 and the second type reference signal 602, respectively; the simulated $5^{th}$ gear position reference signal 605 corresponds to the $5^{th}$ gear position. By artificially adjusting the first type reference signal 601 and the length proportion of the second length region magnet 202, the numerical value distributions of the first type reference signal 601 and the second type reference signal 602 will not overlap within a same coordinate system. In actual use, the measured different sensing signals are compared against the first type reference signal 601 and the second length region magnet 202, respectively; different values are distributed in different curve regions, where the transverse coordinate may represent different angles, thereby distinguishing between the reverse gear position, the forward gear positions, and the neutral gear position.

Specific operation of sensing the neutral gear position is provided below:

In actual use, when the processing unit 402 computes that the inductive electrical signal is within the range of simulated neutral gear position reference signals 607, 608, the processing unit 402 indicates the indicating circuit 404 to generate a neutral gear position signal, specific steps of which are provided below:

In actual use, when the gear shaft 101 is making a rectilinear motion, the sensing apparatus 103 senses the magnetic induction strength and/or magnetic field distribution of the magnet apparatus 102, detects and generates two magnetic induction strength signals having a sinusoidal shape and a cosine shape.

According to the foregoing mathematic formula, the processing unit 402 transduces the two magnetic induction strength signals having the sinusoidal shape and the cosine shape into an inductive electrical signal (an output signal or a numerical value). The inductive electrical signal should fall on the first type reference signal 601 or the second type reference signal 602 shown in FIG. 6.

The processing unit 402 compares the resulting inductive electrical signal against the range of simulated neutral gear position reference signals 607, 608 stored in the memory unit 403. When the processing unit 402 determines that the resulting inductive electrical signal is within the range of the simulated neutral gear position reference signals 607, 608 (a plurality of groups of ranges, or the difference is within a certain interval), the processing unit 402 determines that the gear shaft 101 is at the neutral gear position; in the figure, the neutral angle range is exemplarily expressed to be within −12°~12° by a dotted line, which actually may be any angle within −5°~5°.

When the processing unit 402 determines that the gear shaft 101 is at the neutral gear position, the processing unit 402 indicates the indicating circuit 404 to emit a neutral gear position signal to the external of the sensing apparatus 103.

It needs to be noted that because when the gear shaft 101 is located at the neutral gear position 2036, the simulated reference signal corresponding to the first length region magnet 201 and the simulated reference signal corresponding to the second length region magnet 202 each has a simulated neutral gear position reference signal, respectively, if the actually computed inductive electrical signal is within any range of the two analog neutral gear reference position signals 607, 608, it indicates that the gear shaft 101 is at the neutral gear position 2036.

Specific operation of sensing R gear position is provided below:

In actual use, the processing unit 402 computes an inductive electrical signal; when the inductive electrical signal is within the range of the simulated neutral gear position reference signal 606, the processing unit 402 indicates the indicating circuit 404 to generate a R gear position signal, specific steps of which are provided below:

In actual use, when the gear shaft 101 is at the $5^{th}$~R gear position and rotates to the left to leave the neutral gear position 2036 and engage to the R gear position 204, the sensing apparatus 103 senses the magnetic induction strength and/or magnetic field distribution of the magnet apparatus 102, detects and generates two magnetic induction strength signals having a sinusoidal shape and a cosine shape.

According to the foregoing mathematic formula, the processing unit 402 transduces the two magnetic induction strength signals having the sinusoidal shape and the cosine shape into an inductive electrical signal (an output signal or a numerical value). The inductive electrical signal should fall on the second type reference signal 602 shown in FIG. 6.

The processing unit 402 compares the resulting inductive electrical signal against the simulated R gear position reference signal 606 stored in the memory unit 403. When the processing unit 402 determines that the resulting inductive electrical signal is within the range of the simulated R gear position reference signal 606, the processing unit 402 determines that the gear shaft 101 is at the R gear position.

When the processing unit 402 determines that the gear shaft 101 is at the R gear position, the processing unit 402 indicates the indicating circuit 404 to emit a R position signal to the external of the sensing apparatus 103.

The programs, instruction sets, or data for performing the above operations of sensing the neutral gear position and R gear position may be stored in the memory unit 403 and may be executed or invoked by the processing unit 402.

The manner of detecting the forward gear positions is identical to the above, and the actually measured sensing signals will finally fall on the $1^{st}$~$3^{rd}$ gear position reference signal 603, the $2^{nd}$~$4^{th}$ gear position reference signal 604, or the $5^{th}$ gear position reference signal 605.

The technical features in the respective embodiments described above may be combined in any manner. The embodiments and the accompanying drawings of the present disclosure having been described above are not for limiting the scope of the claims of the present disclosure; any embodiments implemented with the same technical means or within the scope limited in the appended claims will fall within the protection scope claimed by the applicant without departing from the scope of the present disclosure.

What is claimed is:

1. A sensing system for sensing a position of a gear shaft, the gear shaft being provided, in its axial direction, with a plurality of groups of gear positions, the plurality of groups of gear positions including a plurality of neutral gear positions arranged along the axial direction of the gear shaft and a plurality of pairs of motion gear positions oppositely arranged at two sides of the neutral gear positions, one of the motion gear positions being a reverse gear position, while the remaining being forward gear positions, the sensing system comprising:
a sensing magnet that is fixedly arranged on the gear shaft and moves with the gear shaft, wherein the sensing magnet is axially partitioned into a first length region magnet and a second length region magnet; a magnetic field direction of the first length region magnet at a side in contact with the gear shaft is a first polarity, while the magnetic field direction thereof at a side distant from the gear shaft is a second polarity; a magnetic field direction of the second length region magnet at a side in contact with the gear shaft is a second polarity, while the magnetic field direction thereof at a side distant from the gear shaft is a first polarity such that the magnetic field direction of the first length region magnet is opposite to the magnetic field direction of the second length region magnet; and
a sensing unit arranged to be capable of sensing a magnetic field change when the sensing magnet moves, wherein when the gear shaft has a position change upon operation, the sensing unit senses the magnetic field change of the sensing magnet and generates a corresponding inductive electrical signal, the inductive electrical signal being compared against a pre-determined reference inductive electrical signal to indicate whether the gear shaft is at a forward gear position or a reverse gear position.

2. The sensing system according to claim 1, wherein:
the first length region magnet generates a first form of magnetic field change; and
the second length region magnet generates a second form of magnetic field change.

3. The sensing system according to claim 2, wherein:
when the gear shaft moves to the remaining one or more groups of the forward gear positions, the sensing unit senses the first form of magnetic field change to indicate a corresponding forward gear position; and
when the gear shaft moves to the reverse gear position or a corresponding forward gear position, the sensing unit senses the second form of magnetic field change to indicate whether the gear shaft is located at the reverse gear position or the corresponding forward gear position.

4. The sensing system according to claim 1, further comprising:
a memory unit configured for pre-storing a first type reference signal for the first length region magnet and a second type reference signal for the second length region magnet; and
a processing unit connected to the sensing unit and the memory unit, configured for transducing the magnetic change sensed by the sensing unit into an inductive electrical signal and comparing the inductive electrical signal against the first type reference signal and the second type reference signal, to thereby determine whether the gear shaft is at a forward gear position or a reverse gear position.

5. The sensing system according to claim 4, wherein:
the first type reference signal is an inductive electrical signal generated by the sensing unit by simulating, in advance, sensing of motion of the first length region magnet; and
the second type reference signal is an inductive electrical signal generated by the sensing unit by simulating, in advance, sensing of motion of the second length region magnet.

6. The sensing system according to claim 5, wherein:
the first type reference signal has a plurality of first signal reference values that represent positions of a plurality of forward gears;
the second type reference signal has a plurality of second signal reference values that represent positions of forward gears and the reverse gear; and
the processing unit transduces the magnetic field change sensed by the sensing unit into an inductive electrical signal and compares the inductive electrical signal against the plurality of first signal reference values and the plurality of second signal reference values to thereby distinguish between the forward gear positions and the reverse gear position.

7. The sensing system according to claim 6, wherein:
when the inductive electrical signal is identical to one reference value in the plurality of first signal reference values and the plurality of second signal reference values or a difference between the inductive electrical signal and the reference value is within a specific range, the processing unit determines that the gear shaft is at a gear position corresponding to the reference value.

8. The sensing system according to claim 7, further comprising:
an indicating circuit connected to the processing unit;
wherein when the processing unit determines that the gear shaft is at a forward gear position, the processing unit sets the indicating circuit to a first state; and
when the processing unit determines that the gear shaft is at the reverse gear position, the processing unit sets the indicating circuit to a second state.

9. The sensing system according to claim 8, wherein the indicating circuit transmits a state electrical signal to a vehicle control system, for the vehicle control system to make an engine start or stop determination.

10. The sensing system according to claim 6, wherein:
the neutral gear position is arranged within a first rotating angle along two sides of an axis of the gear shaft;
the sensing unit senses a magnetic field strength change within a neutral gear position range where the first length region magnet and the second length region magnet are located within the first rotating angle and generates a sensed electrical signal;
the first type reference signal further has a first neutral gear position reference value representing motion of the first length region magnet;
the second type reference signal also has a second neutral gear position reference value representing motion of the second length region magnet; and the processing unit transduces a magnetic field change sensed by the sensing unit into the inductive electrical signal, and compares the inductive electrical signal against the first neutral gear position reference value and the second neutral gear position reference value; wherein when the inductive electrical signal is identical or substantially identical to the first neutral gear position reference value or the second neutral gear position reference value, the processing unit determines that the gear shaft is at the neutral gear position corresponding to the reference value.

11. The sensing system according to claim 1, wherein:
the second length region magnet corresponds to the reverse gear position and a corresponding forward gear position; and
the first length region magnet corresponds to the remaining forward gear positions.

12. The sensing system according to claim 1, wherein the first length region magnet and the second length region magnet are sequentially arranged along the axial direction of the gear shaft.

13. The sensing system according to claim 1, wherein the sensing unit is arranged relative to the sensing magnet such that: when the gear shaft is at a selected neutral gear position, the sensing unit aligns with the sensing magnet along a radial direction of the gear shaft.

14. The sensing system according to claim 4, wherein the first type reference signal and the second type reference signal do not overlap.

15. The sensing system according to claim 14, wherein a maximum value of the first type reference signal is smaller than a minimum value of the second type reference signal.

16. The sensing system according to claim 1, further comprising a memory unit configured for pre-storing a first type reference signal for the first length region magnet and a second type reference signal for the second length region magnet;
wherein the first type reference signal has a plurality of first signal reference values that represent positions of a plurality of forward gears;
wherein the second type reference signal has a plurality of second signal reference values that represent positions of forward gears and the reverse gear.

* * * * *